Patented Dec. 16, 1952

2,622,033

UNITED STATES PATENT OFFICE 2,622,033

METHOD OF TREATING DRIED FRUIT

Carl J. Fusco, San Francisco, Calif.

No Drawing. Application January 15, 1949, Serial No. 71,220

7 Claims. (Cl. 99—168)

This invention relates to a method of treating dried fruit to prevent or inhibit discoloration thereof.

Whole dried fruits, such as figs and prunes, frequently develop an unsightly coating of crystalline sugar. Apparently this phenomenon results from the usual practice of treating the dried fruit with water to increase its water content. Thereafter, apparently, the fruit juices exude and carry sugars with them to the surface of the fruit. Upon evaporation of the moisture, an unsightly deposit of sugar is left on the surface of the fruit.

Previously, it has been the practice to treat the fruit with mineral oil or dextrin to inhibit the development of an unsightly coating of crystalline sugar. Mineral oil, however, is objectionable, and its use is forbidden by the pure food and drug laws.

Dextrin is edible and harmless but is disadvantageous in that a relatively large quantity must be used to provide the needed inhibitive power. If used in such large quantities, it produces an objectionable powdery color. Many other inhibitors for this purpose have been proposed over a long span of time, but are objectionable from one standpoint or another.

It is an object of the present invention to provide an improved method of treating dried fruits to inhibit the crystallization of sugar thereon.

It is a further object of the invention to provide a method of treating dried fruits to inhibit the development of an unsightly coating thereon, such method being economical and employing a material which does not impart a marked or unpleasant taste to the fruit and which is safe and highly effective.

These and other objects of the invention will be apparent from the ensuing description and the appended claims.

In accordance with the invention, the dried fruit is treated with waxy corn starch, preferably in the form of an aqueous solution or suspension.

I have found that waxy corn starch very effectively inhibits the crystallization of sugar on the fruit and has other advantages detailed hereinbelow.

Preferably, the waxy corn starch is used in the form of a solution produced by mixing one pound of the waxy corn starch with six to ten gallons of water. More or less waxy corn starch may be used, but if greater quantities are used the aqueous solution or mixture is apt to be too thick, and if substantially less is used, the treatment may not be sufficiently effective. It is merely necessary to add the waxy corn starch to the water used in a usual dipping treatment of whole dried fruit, such as figs and prunes. For example, waxy corn starch may be mixed in the stated proportion with water at 180° F. and the mixture stirred until a homogeneous paste or solution is produced. Dried fruit is then immersed in the hot solution (about 212° F.) for ten to fifteen minutes, or as long as necessary to raise the moisture content of the fruit to about twenty-one per cent. A solution of waxy corn starch, once it has been prepared, is preferably used fairly soon. Otherwise, in the course of time a mold develops.

Waxy corn starch is a starch originally derived from Chinese waxy corn, so called because of the waxy appearance of its endosperm. Commercially, waxy corn starch is now produced from a hybrid variety of the original Chinese waxy corn. It may also be derived from barley, rice, millet and grain sorghum. The grain or seed used to produce the starch is processed in the usual way. For example:

Waxy corn is steeped counter-currently forty-eight hours in water containing sulphur dioxide and at a temperature of 128° F. The steeped corn is screened and milled to crack the grains and free the germ. The germ is removed by flotation. The slurry, after separation of the germ, consists of fibre, starch and protein. This slurry is ground to permit separation of the gluten and starch from the fibre by silk reels and shakers. It is then run over tables to settle the starch from the gluten. A typical analysis of waxy corn starch is given in the table below:

Table

| | |
|---|---|
| Moisture, per cent | 12.9 |
| pH | 5.7 |
| SO₂, per cent | 0.007 |
| Acidity (as HCl), per cent | 0.13 |
| Ash, per cent | 0.12 |
| Water solubles, per cent | 0.20 |
| Protein, per cent | 0.30 |
| Viscosity, cc./minute: | |
|   1 part starch to 17 parts water at 66° F | 23 |
|   No. 10 Scott at 3% | 30 |
| Alkali fluidity, cc | No flow |

Among other properties of waxy corn starch which identify and characterize it, there may be mentioned the fact that it dextrinizes considerably faster than corn starch and produces dextrins of high solubility and low viscosity. Also, it stains reddish brown with iodine, whereas, of course, ordinary corn starch stains blue. Chemically, waxy corn starch, which is also known by the trade-mark "Amioca," is high in amylopectin content. Amylopectin has a highly branched chain structure. Further details concerning amylopectin and waxy corn starch will be found in the literature: for example, in Industrial and Engineering Chemistry, volume 34, pages 959 to 962 (1942), and volume 35, pages 1168 to 1172 (1943).

Aqueous solutions of waxy corn starch may be used to treat a large variety of dried fruits to improve their appearance or other characteristics. As indicated, dried figs and dried prunes may be treated with the solution to inhibit the development of an unsightly white coating upon the dried fruit. The other whole dried fruits, such as raisins, may be similarly treated. Cut dried fruits such as peaches, pears and apricots may be similarly treated, and in connection with these fruits it should be noted that the waxy corn starch solution leaves a glossy surface on the fruit which is commercially desirable.

It is thus apparent that a method of treating whole and cut dried fruits to inhibit the development of an objectionable white coating thereon and/or to leave a desirable glossy surface on the fruit, has been provided. It is further apparent that a solution has been provided for treating fruits which is easy and economical to produce and is simple to use. It is further evident that the dried fruit is improved thereby, is edible and is not deleteriously affected as to taste, odor or physiological action.

Waxy corn starch may also be used to inhibit crystallization of sugar in honey and other sugar containing products, as by adding a small amount to the honey. Also it may be used to treat glace fruit to inhibit crystallization of sugar. In treating glace fruit, the waxy corn starch may be applied to the finished fruit in the manner described above in connection with dried fruits, or it may be added to the sugar solution used in processing the fruit to produce the glace product.

While I have shown certain preferred forms of my invention, it is to be understood that various changes may be made by those skilled in the art without departing from the spirit of the invention as defined in the appended claims.

Having thus described my invention, what I claim and desire to secure by Letters Patent is:

1. A method of treating dried fruits having a tendency to exude juices containing sugars and to leave a deposit of crystalline sugar on the surface thereof, which comprises treating the fruit with waxy corn starch to leave a superficial deposit of waxy corn starch thereon.

2. A method of treating dried fruits having a tendency to exude juices containing sugars and to leave a deposit of crystalline sugar on the surface thereof, which comprises treating the fruit with an aqueous solution of waxy corn starch to leave a superficial deposit of waxy corn starch thereon.

3. A method of treating dried fruits having a tendency to exude juices containing sugars and to leave a deposit of crystalline sugar on the surface thereof, which comprises treating the fruit with an aqueous solution of waxy corn starch containing about one pound of waxy corn starch to six to ten gallons of water, to leave a superficial deposit of waxy corn starch on the articles treated which is sufficient to inhibit crystallization of sugar thereon.

4. A method of treating whole dried fruits, which comprises treating the same with an aqueous solution of waxy corn starch of approximately one pound to six gallons of water to leave a surface deposit of the waxy corn starch on the fruit to inhibit crystallization of sugar thereon.

5. A method of treating figs which comprises treating the same with an aqueous solution of waxy corn starch of approximately one pound to six gallons of water to leave a surface deposit of the waxy corn starch on the fruit to inhibit crystallization of sugar thereon.

6. A method of treating cut dried fruit which comprises treating the same with an aqueous solution of waxy corn starch of approximately one pound to six gallons of water to leave a surface deposit of the waxy corn starch on the fruit to inhibit crystallization of sugar thereon.

7. In the treatment of dried fruit to adjust the moisture content thereof, wherein said fruit is immersed in a body of water to increase substantially the moisture content of the fruit, the improvement which comprises so treating said fruit with water in the presence of waxy corn starch dispersed in the water.

CARL J. FUSCO.

REFERENCES CITED

The following references are of record in the file of this patent:

UNITED STATES PATENTS

| Number | Name | Date |
| --- | --- | --- |
| 1,943,468 | Bridgeman et al. | Jan. 16, 1934 |
| 2,084,956 | Hessel | June 22, 1937 |
| 2,462,108 | Piana | Feb. 22, 1949 |

OTHER REFERENCES

"Industrial and Engineering Chemistry," vol. 36, No. 10, pages 958 to 963, article entitled "Glutinous Corn and Sorghum Starches."

"Industrial and Engineering Chemistry," vol. 35, No. 11, pages 1168 to 1172, article entitled "Waxy Cornstarch as a Replacement for Tapioca."

"Food Industries," December 1945, pages 106, 107, and 108, article entitled "Amioca—The Starch From Waxy Corn."